United States Patent [19]

Brenneman

[11] Patent Number: 4,467,954
[45] Date of Patent: Aug. 28, 1984

[54] PROCESS FOR OBTAINING A COMPOSITE ARTICLE

[75] Inventor: William L. Brenneman, Cheshire, Conn.

[73] Assignee: Olin Corporation, New Haven, Conn.

[21] Appl. No.: 308,622

[22] Filed: Oct. 5, 1981

[51] Int. Cl.³ .............................................. B23K 20/04
[52] U.S. Cl. ...................................... 228/117; 228/243
[58] Field of Search ........................ 228/117, 235, 243

[56] References Cited

U.S. PATENT DOCUMENTS

| | | | |
|---|---|---|---|
| 1,667,787 | 5/1928 | Jaeger et al. | 228/117 |
| 2,691,815 | 10/1954 | Boessenkool et al. | |
| 2,753,623 | 7/1956 | Boessenkool et al. | |
| 2,767,467 | 10/1956 | Siegel | |
| 2,782,498 | 2/1957 | Mushovic et al. | 228/205 |
| 3,269,004 | 8/1966 | Smith, Jr. et al. | 228/190 |
| 3,295,197 | 1/1967 | Bunn et al. | 228/175 |
| 3,300,837 | 1/1967 | Fisher et al. | 228/235 X |
| 3,381,364 | 5/1968 | Winter | 228/172 |
| 3,381,365 | 5/1968 | Winter | 228/172 |
| 3,381,366 | 5/1968 | Winter | 228/172 |
| 3,392,436 | 7/1968 | Winter | 228/172 |
| 3,392,437 | 7/1968 | Winter | 228/172 |
| 3,397,045 | 8/1968 | Winter | 428/612 |
| 3,462,827 | 8/1969 | Winter | 228/172 |
| 3,462,828 | 8/1969 | Winter | 228/172 |
| 3,470,607 | 10/1969 | Rader et al. | |
| 3,496,621 | 2/1970 | Winter | |
| 3,496,625 | 2/1970 | Winter | |
| 3,634,926 | 1/1972 | Winter | |
| 3,740,828 | 6/1973 | Buchinski et al. | 228/116 |
| 4,244,203 | 1/1981 | Pryor et al. | 72/205 |
| 4,329,863 | 5/1982 | Pryor et al. | |
| 4,330,599 | 5/1982 | Winter et al. | |
| 4,362,262 | 12/1982 | Winter et al. | |

Primary Examiner—Kuang Y. Lin
Attorney, Agent, or Firm—Barry L. Kelmachter; Paul Weinstein; Howard M. Cohn

[57] ABSTRACT

A process for forming a composite material from a core material having a first yield strength and a clad material having a second yield strength comprises passing the materials through at least one roll bite formed by at least two rolls rotating at different speeds relative to each other. A bond is formed between the core and clad materials by causing a reduction in the thickness of the materials as they pass through the at least one roll bite. The amount of reduction and the compressive force magnitude required to effect the bond is minimized. The process also includes applying back tension forces to the materials. In a preferred embodiment, different back tension forces are applied to the core and clad materials.

8 Claims, 6 Drawing Figures

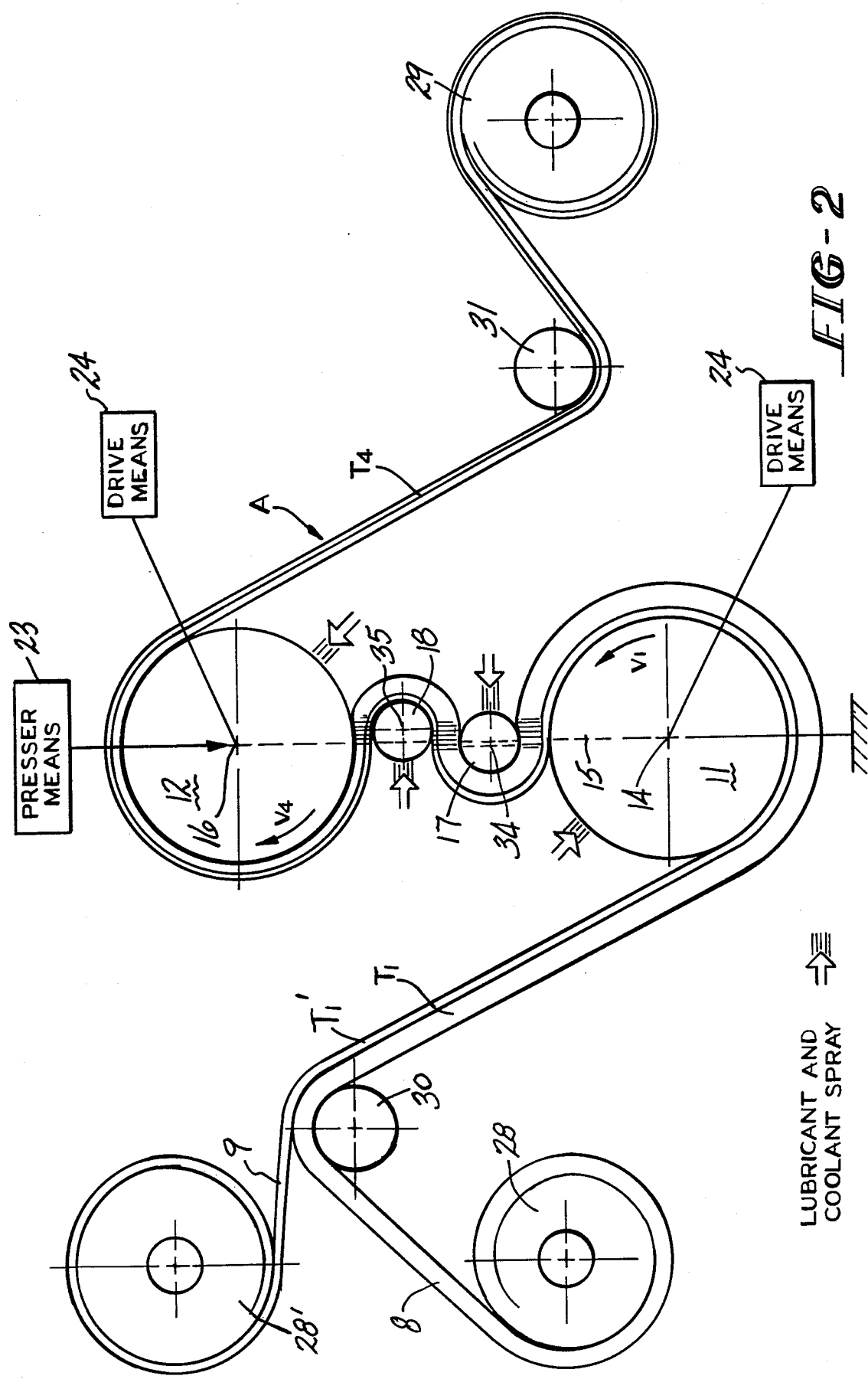

PROCESS FOR OBTAINING A COMPOSITE ARTICLE

The invention described herein relates to a method of forming a composite material from at least two materials having different yield strengths. The instant invention is applicable to a wide range of metals and metal alloys which are capable of plastic deformation.

Composite articles made of dissimilar metals are highly desirable commercially due to the fact that the beneficial characteristics of the core and cladding materials may be obtained in one composite article. Frequently, many properties in a single alloy cannot be greatly modified by alloying or thermal treatments, for example such properties as modulus of elasticity, color, density and strength in combination with high thermal or electrical conductivity. However, by forming composites apparent properties of the cladding can be generated while retaining the bulk properties of the core material. In this manner one can often obtain greatly modified and highly desirable properties over the single alloy.

It is known in the prior art to bond composite strip on a conventional rolling mill. U.S. Pat. No. 1,667,787 to Jaeger et al. discloses a method of applying aluminum plating to iron and steel sheets and bands using a conventional rolling mill. In some prior art approaches utilizing a conventional rolling mill, the bonding process includes some sort of heat treatment. The heat treatment may comprise heating the rolls through which the material to be bonded passes, heating the materials to be bonded in a furnace prior to rolling, etc. U.S. Pat. No. 2,782,498 to Mushovic et al. and U.S. Pat. No. 3,269,004 to Smith et al. exemplify such heat treatments. However, heat treatments frequently cause oxides to form on the surfaces of the materials to be bonded. These oxides can cause the formation of weak bonds.

Bonding composite strip on a conventional rolling mill typically requires that a single pass bonding reduction of from 50% to 70% be used to attain acceptable bond strength. Such large reductions have been used commercially with success to make cupronickel-copper-cupronickel composite coinage material. However, when bonding two materials having significantly different yield strengths, there is a bonding reduction if which exceeded results in the composite strip developing an unacceptable surface. This undesirable appearance can be descriptively identified as a corrugated surface. This upper limit on the allowable bonding reduction for any two materials can be predicted. In general, the larger the yield strength difference of the materials to be bonded, the smaller the allowed bonding reduction. It is not uncommon for the maximum allowable reduction to be less than 40%.

One approach to forming composites from dissimilar metals with reductions in the range of about 35% to about 80% is shown in U.S. Pat. Nos. 3,381,364, 3,381,365, 3,381,366, 3,392,436, 3,392,437, 3,397,045, 3,462,827 and 3,462,828, all to Winter. In general, the process of this approach comprises: (1) providing a core in plate form; (2) providing a cladding in plate form; (3) heating the core; and (4) rolling together the core and cladding in one pass at a reduction between about 35% and about 80% with the core and cladding coming together for the first time in the bite of the rolls, the cladding contacting the roll prior to contacting the core, and the included angle between the core and the cladding upon entering the rolls being in excess of 5 degrees. This process has successfully produced composites from a core made of one of a variety of metal or metal alloys and a clad with a dissimilar metal chosen from a wide group of dissimilar metal alloys.

Another approach for forming composites from different materials utilizes a rolling operation which employs different roll speeds. This approach may also use: a roll having a smoother surface than another roll in contact with one of the materials; and lubricants for controlling the relative elongation of the metal sheets. It is suggested in the prior art that to effect a strong bond with this approach, the metal sheets have to undergo some sort of heat treatment. The heat treatment may be effected either before the rolling operation by causing the sheets to be passed through a furnace or after the rolling operation by placing the coil of initially-bonded composite material in an annealing furnace to be sintered. U.S. Pat. No. 3,295,197 to Bunn et al. and U.S. Pat. No. 3,740,828 to Buchinski et al. exemplify the different roll speed approach.

Both the Winter approach and the different roll speed approach utilize heat treatment of the materials. This means that the equipment used to perform the process must include some form of heat treatment apparatus such as a furnace, an anneal system or the like. These approaches also generally require particular orientations of the strip materials relative to the rolls. As a result, the equipment to carry out the process is frequently complicated and the time to form the composite is increased. While the Winter approach does not appear to have this problem, some approaches which utilize heat treatments prior to rolling cause oxides which inhibit bond formation to be formed on the surfaces of the materials.

The composite forming process of the instant invention comprises bonding on rolling mill having a roll speed mismatch. The process described herein provides acceptable bond strength at bonding reductions substantially less than the reductions required on conventional mills, does not require any heat treatments prior to or after the rolling operation, and does not require any particular strip to roll orientation to effect a strong bond. The process of the instant invention preferably applies different back tensions to the different materials to be bonded together so that each strip of material has substantially the same speed as the roll which it contacts. By doing this, a range of separating forces can be used to effect a given reduction.

In a preferred embodiment, the process of the instant invention is carried out utilizing a co-operative rolling mill apparatus similar to that shown in U.S. Pat. No. 4,244,203 to Pryor et al. and in U.S. patent application Ser. No. 167,084, filed July 9, 1980 to Pryor et al., now U.S. Pat. No. 4,329,863, allowed U.S. patent application Ser. No. 260,491, filed May 7, 1981 to Brenneman now U.S. Pat. No. 4,412,439 and allowed U.S. patent application Ser. No. 301,331, filed Sept. 11, 1981 to Brenneman et al, now U.S. Pat. No. 4,414,832. This apparatus has a plurality of roll bites formed by a plurality of adjacent rolls. Strips of material passing through this mill can undergo a plurality of reductions in a single pass.

When using the co-operative rolling mill apparatus, the strips of material having different yield strengths preferably first come together as they pass over a billy roll or idler roll arrangement prior to being wrapped about an entry roll. The rolls of the co-operative mill form a plurality of roll bites. It is believed that the shear stresses acting on the strips in each roll bite tend to act parallel to the plane of the strips across which bonding takes place and thereby enhance the bonding of the strips. Due to the different yield strengths, different back tensions are preferably applied to the strips. The different back tensions permit each strip to move with its contacting roll. In this manner, the separating or compressive force required to obtain a given reduction should be lower than that needed in a conventional rolling mill to effect the same reduction. Further, a range of separating forces may be utilized to obtain a given reduction. The use of the different back tensions also permits rolling to gage in a single pass.

In addition, the process of the instant invention minimizes the amount of reduction and the compressive force magnitude required to effect the bond between the strips. It is believed that by using the process of the instant invention that a strong bond between the materials can be effected with reductions in the range of about 40% to about 60%, preferably about 45% to about 55%.

Accordingly, it is an object of this invention to provide a process of forming a composite material having a strong bond from materials having different yield strengths.

It is a further object of this invention to provide a process as above for effecting bonding of said materials at smaller reduction values than those needed in processes using conventional rolling mills.

It is a further object of this invention to provide a process as above for forming a composite material without any need for heat treatment of the materials prior to and/or after effecting said bond.

These and other objects will become more apparent from the following description and drawings wherein like numerals depict like parts.

FIG. 2 is a schematic illustration of a side view of a co-operative rolling mill apparatus used for forming the composite material.

Figure 1:
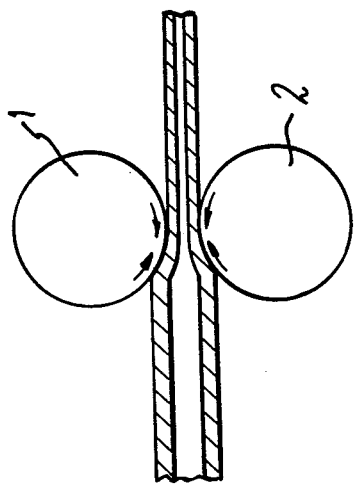
FIG. 1 is a schematic illustration of a conventional prior art rolling mill used to bond two materials together and the shear stresses produced in the roll bite.

In accordance with the present invention, a process for forming a highly useful composite article clad on either one side or both sides is disclosed herein. The process of the instant invention is particularly applicable for bonding two materials having different yield strengths together. The process of the instant invention can be used with a variety of materials. For example, the core material may comprise a copper base alloy, an aluminum base alloy, an iron base alloy, or the like while the cladding may comprise a material selected from the group consisting of a dissimilar aluminum base alloy, a copper base alloy, a lead base alloy, a silver base alloy, a nickel base alloy, a zirconium base alloy, a zinc base alloy, a chromium base alloy, a refractory metal, a titanium base alloy, a tin base alloy, an iron base alloy, or the like.

The process of the instant invention comprises: providing a core material having a first yield strength in strip form having a first thickness; providing a clad material having a second yield strength in a strip form having a second thickness; providing a rolling mill having at least one roll bite formed by at least two rolls rotating at different speeds and in different directions relative to each other; producing a compressive force having a magnitude between said at least two rolls; and forming a strong metallurgical bond between the core and clad materials without any need for heat treatment of the materials prior to and after effecting the bond by passing the materials through said at least one roll bite and causing a reduction in said thicknesses. The process further includes applying back tension forces, preferably having different magnitudes, to the strips so that each strip moves at substantially the same speed as the speed of its contacting roll.

The process of the instant invention permits bonding of materials having different yield strengths at reductions less than those required in bonding with conventional rolling mills. It is believed that bonding can be effected using a reduction of about 40% to about 60% and preferably about 45% to about 55%. The process of the instant invention also provides a range or operating window of separating forces over which a given reduction can be obtained.

It has been found that the simple process delineated above achieves a highly advantageous composite article having excellent physical properties, very high bond strengths and the absence of atomic interdiffusion between base metal and cladding, which interdiffusion may result in the formation of brittle compounds. The present invention achieves these surprising advantages by means of a simple and convenient process and without the use of expensive devices such as are frequently employed in the art.

In accordance with a preferred embodiment of the instant invention, a copper base alloy is employed as the core material. The copper base alloy may comprise any alloy containing a major proportion of copper. Typical alloys which may be employed include but are not limited to the following: high purity copper, tough pitch copper, OFHC (oxygen free high conductivity) copper and conventional brasses and bronzes. Typical alloying substituents include but are not limited to the following: aluminum, iron, silicon, lead, phosphorous, silver, gold, platinum, palladium, tin, nickel, zirconium and zinc.

It is preferred, but not required, in accordance with the present invention to mechanically roughen the bonding surfaces of both the core and the cladding materials in order to assure good surface contact. For example, the surfaces may be wire brushed or abraded, etc.

The cladding material may be any of the cladding materials indicated hereinabove. In a preferred embodiment, the cladding material comprises austenitic stainless steel.

The starting material, both core and cladding, should be in strip form. They can be in any temper or condition, hard or soft. Since the instant process is carried out at room temperature, surface oxides are generally no handicap to the process of the instant invention. Frequently, conventional processing utilizes special atmospheres to avoid formation of surface oxides prior to bonding of the composite materials. These special precautions are not required with the present invention.

It is, however, highly desirable to remove dirt or adhering lubricant from the surface of the metal prior to the process of the present invention in order to assure good contact between the core and the cladding materials. Any conventional cleaning process may be readily employed. For example, the core and cladding materials may be passed through a soap or a detergent solution in accordance with conventional procedures. Examples of such cleaning procedures include the use of commercial alkaline cleaners and solvent cleaners such as carbon tetrachloride and trichloroethylene.

The process of the instant invention may be carried out in any rolling mill, i.e. two-high, three-high, four-high, six-high, cluster mill, etc. having rolls operating at different speeds. The process of the instant invention is particularly adaptable for use with a co-operative rolling mill such as that shown in FIGS. 2–4.

FIG. 1 shows bonding of a composite in the roll bite of a conventional prior art rolling mill. The roll bite is formed by rolls 1 and 2. In a conventional roll bite, the shear stresses developed at the roll-strip surfaces always point toward the center of the roll bite. At any location in the roll bite, the shear stresses on both sides of the roll bite act in the same direction, i.e. they never oppose each other. As a result, virtually no shear stresses are developed across the interfaces to be bonded. Furthermore, bonding composite strip on a conventional rolling mill typically requires that a single pass bonding reduction of from 50% to 70% be used to attain acceptable bond strength. However, when bonding two materials having significantly different yield strengths, there is a bonding reduction if which exceeded results in the composite strip developing an unacceptable surface. This undesirable appearance can be descriptively identified as a corrugated surface. In general the larger the yield strength difference of the materials to be bonded, the smaller the allowed bonding reduction. It is not uncommon for the maximum allowable reduction to be less than 40%.

Figure 5:
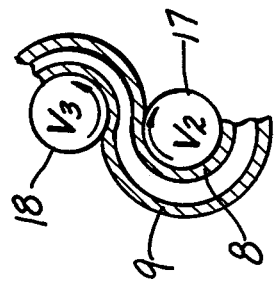
FIG. 5 is a schematic illustration of the bonding process and corresponding shear stresses developed across interfaces when bonding with a roll speed mismatch in one of the roll bites of the co-operative rolling mill apparatus.

In contrast, as shown in FIG. 5, the roll bite formed between rolls having a speed mismatch such as rolls 17 and 18 has high shear stresses acting parallel to the planes of the strips across which bonding is to occur. These shear stresses and the corresponding shear strains between strip interfaces cause accelerated breakdown of the surface films thus resulting in good bond strength at smaller bonding reductions than those required to effect bonding on a conventional mill.

When bonding on a mill having a roll speed mismatch, any rolling parameter that increases the shear stress along the bonding interfaces should reduce the bonding reduction required to attain acceptable bond strength. Therefore, increasing roll roughness, decreasing the volume of lubricant supplied to the roll-strip interface, and increasing separating force or the like should reduce the bonding reduction required to obtain acceptable bond strength.

Figure 4:
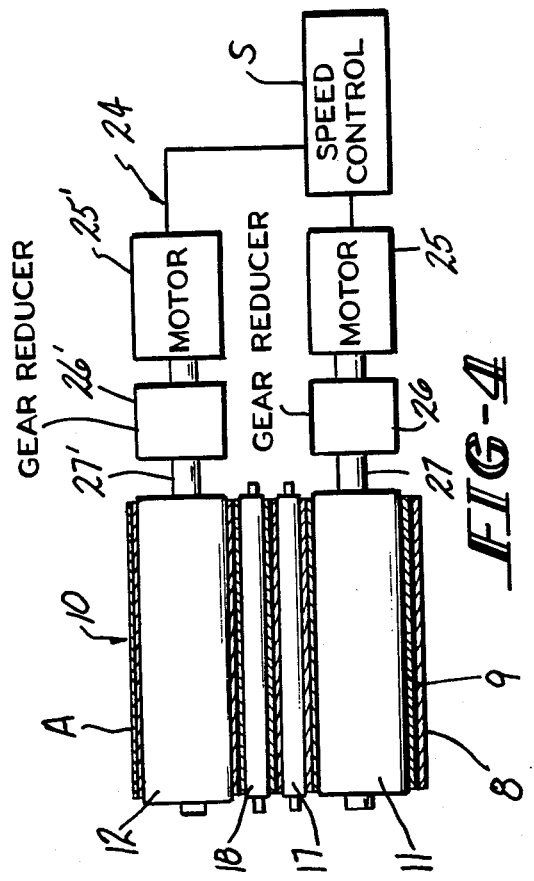
FIG. 4 is a partial view showing the drives to the rolls of the apparatus of FIG. 2.
Figure 3:
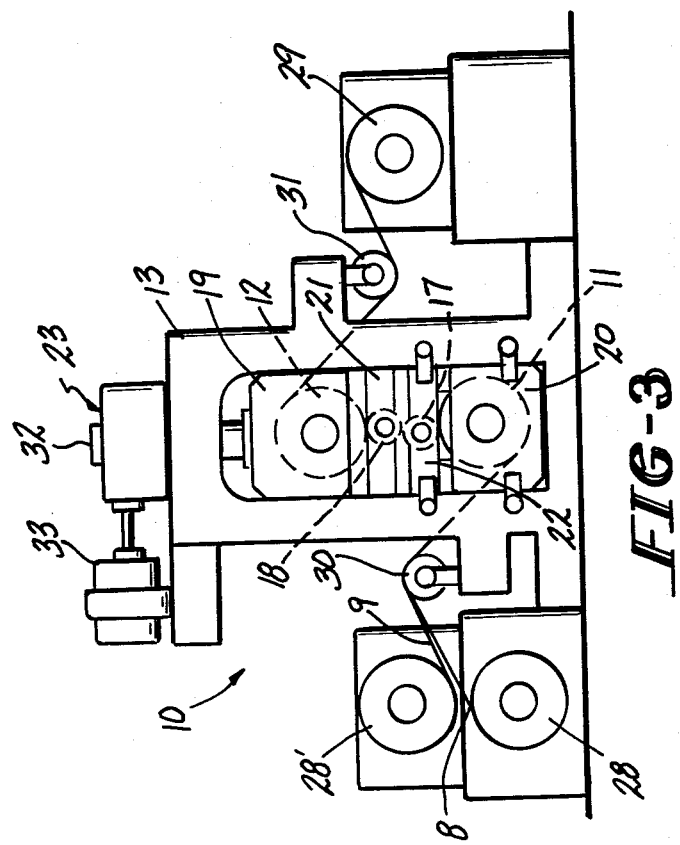
FIG. 3 is a more detailed illustration of the apparatus of FIG. 2.

In a preferred embodiment, the process of the instant invention is performed utilizing the co-operative rolling mill 10 of FIGS. 2–4. The co-operative rolling mill 10 comprises first 11 and second 12 back-up rolls of relatively large diameter. The lower back-up roll 11 is journaled for rotation in the machine frame 13 of the rolling mill about a fixed horizontal roll axis 14. The upper back-up roll 12 is journaled for rotation in the machine frame 13 about roll axis 16 and is arranged for relative movement toward and away from the lower back-up roll 11 along the vertical plane 15 defined by the back-up roll axes 14 and 16. Arranged between the upper 12 and lower 11 back-up rolls are two free wheeling work rolls 17 and 18 having a diameter substantially smaller than the diameter of the back-up rolls 11 and 12. The work rolls 17 and 18 are journaled for rotation and arranged to idle in the machine frame 13. They are adapted to float in a vertical direction along the plane 15. The specific support mechanisms 19, 20, 21 and 22, etc. for the respective rolls 11, 12, 17 and 18 of the mill 10 may have any desired structure in accordance with conventional practice.

A motor driven screwdown presser means 23 of conventional design is utilized to provide a desired compressive force, known as the separating force, between the back-up rolls 11 and 12 and their co-operating work rolls 17 and 18 and between the work rolls themselves.

The speed relationship between the lower back-up roll 11 and the upper back-up roll 12 is such that the peripheral speed of the lower back-up roll $V_1$ is less than the peripheral speed $V_4$ of the upper back-up roll 12. This can be accomplished relatively easily by a two motor drive 24 as in FIG. 4 which will drive the upper back-up roll 12 at a higher speed relative to the lower back-up roll 11 in proportion to the desired reduction in overall thickness of the strips 8 and 9 through the mill. The back-up rolls 11 and 12 are driven by motors 25 and 25' which are connected to the rolls 11 and 12 through reduction gear boxes 26 and 26' and drive spindles 27 and 27'. A speed control S is connected to the motors 25 and 25' in order to drive the rolls 11 and 12 at the desired speed ratio. The particular drive system 24 which has been described above does not form part of the present invention and any desired drive system for driving the rolls 11 and 12 at the desired peripheral speed ratio could be employed. The drive to the work rolls 17 and 18 is provided by the back-up rolls 11 and 12 acting through the encompassing strips.

The strips 8 and 9 are strung or threaded as shown in FIG. 2 whereby the incoming strips are wrapped around the slower moving back-up roll 11 and then forms an "S" shaped bridle around the work rolls 17 and 18 and finally exit as composite strip A by encompassing the fast moving back-up roll 12. In this manner, three reductions may be taken in the strips as they pass through the mill 10. The first reduction is between the slow moving lower back-up roll 11 and its co-operating lower work roll 17. The second reduction is between the lower and upper work rolls 17 and 18. The third reduction is between the upper work roll 18 and its cooperating fast moving upper back-up roll 12.

Back tensions $T_1$ and $T_1'$ may be applied to the strips 8 and 9 in a conventional manner by any desired means such as coilers/decoilers 28 and 28' so that each strip has substantially the same speed as the roll or rolls that it contacts. In a preferred mode, different back tensions are applied to the strips 8 and 9 since the strips have different yield strengths. Each back tension is preferably about 0.2 of the yield strength of the strip material. A forward tension $T_4$ may be applied to the composite strip A by coiler/decoiler 29. Billy or idler roll 30 arranged as shown is used to redirect the direction of strips 8 and 9 to provide the desired wrapping about the back-up roll 11. Billy or idler roll 31 arranged as shown is used to redirect the direction of the emerging composite strip A to provide the desired wrapping about the back-up roll 12. Any suitable idler roll arrangement may be utilized for billy or idler rolls 30 and 31.

The strips 8 and 9 forming composite strip A encompass each of the work rolls 17 and 18 through about 180° of the circumference of the rolls. In the embodiment shown, strips 8 and 9 encompass the back-up roll 11 and composite strip A encompasses the back-up roll 12 to a greater extent, namely about 270°.

Coolant and lubricant may be selectively applied to the back-up rolls 11 and 12 and work rolls 17 and 18. The specific apparatus for applying the coolant and lubricant may be of any desired conventional design as are known in the art. One system for applying the coolant and lubricant is that disclosed in co-pending allowed U.S. patent application Ser. No. 260,491, filed May 7, 1981 to Brenneman now U.S. Pat. No. 4,412,439, which is hereby incorporated by reference.

In operation, strips 8 and 9 are threaded through the mill 10 in the manner shown in FIG. 2. Suitable back tensions $T_1$ and $T_1'$ are applied to the trailing portions of strips 8 and 9 by means of coilers/decoilers 28 and 28' and suitable forward tension is applied to the forward portion of the composite strip A by means of coiler/decoiler 29. The presser means 23 which may be of any conventional design and which may be hydraulically actuated (not shown) or screw 32 actuated through a suitable motor drive 33 is operated to apply a desired and essential operating pressure or compressive force between the respective rolls 11, 12, 17 and 18. The tensions $T_1$, $T_1'$ and $T_4$ applied to the strips should also be sufficient to prevent slippage between the rolls 11, 12, 17 and 18 and the strips. The motor 25 is energized to advance the strips 8 and 9 through the mill 10 by imparting drive to the back-up rolls 11 and 12 which in turn drive the idling work rolls 17 and 18 through the strips. The upper back-up roll 12 and the work rolls 17 and 18 may be arranged for floating movement vertically along the plane 15. In one embodiment not shown the roll axes 14, 16, 34 and 35 of each of the back-up rolls 11 and 12 and work rolls 17 and 18, respectively, all lie in the single vertical plane 15. In a preferred embodiment, however, to attain greater stability for the work rolls 17 and 18, the plane defined by the axes 34 and 35 of the work rolls 17 and 18 can be tilted very slightly with respect to the plane 15 defined by the axes 14 and 16 of the back-up rolls 11 and 12. Any suitable tilt angle as known in the art may be defined between the plane of the work rolls 17 and 18 and the plane of the back-up rolls 11 and 12. The plane of the work rolls 17 and 18 when tilted should preferably be tilted in a direction to further deflect the strips, namely clockwise as viewed in FIG. 2. However, it may not be essential in accordance with this invention that the plane of the work rolls 17 and 18 be tilted with respect to the plane 15 of the back-up rolls 11 and 12 and such an expedient is preferably employed when it is necessary to provide stabilization of the work rolls 17 and 18.

The presser means 23 are adapted to apply the pressure to the respective rolls 11, 12, 17 and 18 rather than generating such pressure between the respective rolls solely by means of the tension applied to the strips. When the mill 10 is powered up and put under reasonable separating force by the presser means 23, the three reduction points may be attained as shown in FIG. 2 and bonding of the strips 8 and 9 occurs. It is believed that bonding occurs as the result of high shear stresses acting parallel to the planes of the strips across which bonding is to occur. These shear stresses and the corresponding shear strains between strip interfaces cause accelerated breakdown of the surface films thus resulting in good bend strength. It is believed that bonding can be achieved with smaller reductions than those required when bonding on a conventional mill. Bonding should occur with reductions from about 40% to about 60% and preferably from about 45% to about 55%. It is further believed that the amount of reduction in each of the strips 8 and 9 will be substantially the same.

In utilizing the apparatus 10 described above, three rolling reductions may be accomplished in one pass of the strips through the mill 10. It is believed that the forward and back tensions in the reduction zones for this process are partially provided by the wrapping of the strips around the driven back-up rolls 11 and 12 in such a way as to provide shear drag on the strips. Since the strips 8 and 9 encompass the slower large driven roll 11, little or no slipping should occur around the periphery of the roll 11 because of the back tensions $T_1$ and $T_1'$ provided by the coilers/decoilers 28 and 28' and the shear drag of the roll itself. A similar situation exists for the upper back-up roll 12 because of the forward tension $T_4$ and the shear drag of the roll 12. As a result, the strips 8 and 9 tend to move substantially at the same speed as the contacting roll surfaces and the compressive force needed to effect a given reduction has a range of values. This range of compressive forces is known as the operating window.

Figure 6:
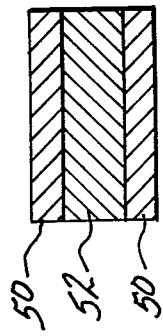
FIG. 6 is a cross sectional view of a composite material having clad material on opposed surfaces of the core material.

If clad material 50 is to be applied to both sides of a core material 52 as shown in FIG. 6, mill 10 may be modified to accommodate a third strip of material not shown. Another coiler/decoiler not shown would be added to the mill 10 to provide a back tension to the third strip. The third strip would be wound through the mill in the "S" shaped bridle arrangement described above and preferably would contact the other strips at the entry billy roll.

It should be noted that it is a particular advantage of the present invention that it is unnecessary to utilize bonding aids, such as a thin coating of a dissimilar metal, in order to effect the strongly adherent cladding of the present invention.

A further advantage of the present invention is that subsequent to the rolling operation the composites of the present invention do not require subsequent diffusion anneals, i.e. conventional processing frequently requires diffusion anneals to secure the bond between the core and the cladding. The fact that the present invention does not require diffusion anneals is significant since diffusion anneals might, and frequently do, cause blisters or the like due to the long treatment times required and co-diffusion of gases to the interface between the core and the cladding.

In fact, subsequent to the rolling operation no further operations whatever are required. The composites of the present invention are provided in commercial form ready to be used for the desired application. It may be naturally desirable to perform conventional subsequent operations for particular applications. For example, short thermal treatments for stress relief or the attainment of desired properties, e.g. a short heat treating anneal or aging treatment, a rolling operation for dimensional control, additional work hardening, and so forth.

In a particular application of the instant invention, a copper base alloy material forming a core is clad on both sides with an austenitic stainless steel alloy material using a reduction of about 45% to about 55%, preferably about 50%.

In summary, a process for obtaining a composite article having a strong bond without the need for any heat treatments prior to and/or after effecting the bond has been disclosed herein. The process in accordance with the instant invention minimizes the magnitude of the reduction necessary to effect the bond. As a result of the minimized reduction magnitude, the compressive or separating forces required are also minimized.

The advantages of bonding composite strip using a roll speed mismatch in accordance with the instant invention include: (1) the ability to bond material combinations that have a large yield strength differential and thus attain unique composite material properties that were previously unattainable; and (2) as a result of the ability to utilize the roll speed mismatch to control the bonding reduction, the bonding process should allow the fabrication of a one step roll-to-gage product. With conventional bonding, gage variation along the length of the strip could be significant. If the gage variation is significant, the composite strip must be given skin passes subsequent to bonding to attain acceptable gage tolerance.

While the instant invention has been described in conjunction with a co-operative rolling mill, it is applicable to other types of rolling mills which have a roll speed mismatch.

The patents, patent applications, and articles set forth in the background of this application are intended to be incorporated by reference herein.

It is apparent that there has been provided in accordance with this invention a process for obtaining a composite article which fully satisfies the objects, means and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A process for forming a well-bonded composite material, said process comprising:
   providing a core material and a dissimilar clad material both in strip form;
   providing a rolling mill having a plurality of rolls forming a plurality of roll bites, each of said roll bites being formed by two adjacent ones of said rolls and at least one of said rolls forming with respective other ones of said rolls more than one of said roll bites;
   rotating each of said rolls forming each roll bite at a different peripheral speed;
   applying a first back tension force having a first magnitude to said core material;
   applying a second back tension force to said clad material, said second back tension force having a second magnitude different from said first magnitude;
   said first and second back tension forces assisting in substantially preventing slippage between said core and clad materials and said rolls as said materials pass through said mill;
   bringing said core and clad materials into abutting relationship prior to said materials entering a first one of said roll bites; and
   rolling said core and clad materials together in an unheated condition to form said composite material, said rolling step comprising wrapping said abutting core and clad materials about an entry roll of said mill to assist in the application of said different back tension forces, passing said core and clad materials through said mill in a serpentine fashion and applying a compressive force to said rolls so that said core and clad materials undergo a plurality of reductions during each pass through said mill.

2. The process of claim 1 further comprising:
   said core and clad materials each having a yield strength; and
   said back tension force applying steps comprising applying to each of said materials a back tension substantially equal to about 0.2 of its yield strength.

3. The process of claim 1 wherein said rolling step further comprises:
   rolling said core and clad materials together with a reduction of about 40% to about 60%.

4. The process of claim 1 wherein said rolling step further comprises:
   rolling said core and clad materials together with a reduction of about 45% to about 55%.

5. The process of claim 1 further comprising:
   bonding said clad material to opposed surfaces of said core material.

6. The process of claim 1 wherein:
   said rolling mill providing step comprises providing a mill having at least first and second driven back-up rolls and at least first and second idling work rolls arranged between said first and second back-up rolls, said work rolls having substantially smaller diameters than said back-up rolls;
   said roll rotating step comprises driving said back-up rolls so that the peripheral speed of said first back-up roll is less than the peripheral speed of said second back-up roll; and
   said wrapping and passing steps comprise wrapping said materials about said first back-up roll, forming an S-shaped bridle about said work rolls, and wrapping said materials about said second back-up roll, whereby a first of said reductions is taken in a first roll bite between said first back-up roll and said first work roll, a second of said reductions is taken in a second roll bite between said work rolls and a third of said reductions is taken in a third roll bite between said second work roll and said second back-up roll.

7. The process of claim 1 futher comprising:
   providing a copper base alloy as one of said core and clad materials.

8. The process of claim 7 further comprising:
   providing a stainless steel as the other of said core and clad materials.

* * * * *